US009785761B2

(12) United States Patent
Rao

(10) Patent No.: US 9,785,761 B2
(45) Date of Patent: Oct. 10, 2017

(54) UNLOCKING A LOCKED USER DEVICE USING A COMPUTER GENERATED UNLOCK CODE PROVIDED BY A USER

(75) Inventor: Bindu Rao, Laguna Niguel, CA (US)

(73) Assignee: QUALCOMM Incorporated, San Diego, CA (US)

( * ) Notice: Subject to any disclaimer, the term of this patent is extended or adjusted under 35 U.S.C. 154(b) by 674 days.

(21) Appl. No.: 13/055,215

(22) PCT Filed: Jul. 31, 2008

(86) PCT No.: PCT/US2008/071762
§ 371 (c)(1),
(2), (4) Date: Jan. 21, 2011

(87) PCT Pub. No.: WO2010/014097
PCT Pub. Date: Feb. 4, 2010

(65) Prior Publication Data
US 2011/0128119 A1    Jun. 2, 2011

(51) Int. Cl.
*G06F 21/00*  (2013.01)
*G06F 21/31*  (2013.01)
(Continued)

(52) U.S. Cl.
CPC .............. *G06F 21/31* (2013.01); *H04M 1/66* (2013.01); *H04M 1/673* (2013.01); *H04M 1/67* (2013.01)

(58) Field of Classification Search
CPC .... G06F 17/30067; G06F 21/88; G06F 21/31; G06F 21/6218; G06F 21/10;
(Continued)

(56) References Cited

U.S. PATENT DOCUMENTS 5,732,212 A * 3/1998 Perholtz et al. ............... 709/224
5,987,609 A * 11/1999 Hasebe .......................... 726/35
(Continued)

FOREIGN PATENT DOCUMENTS

CN       1717082 A       1/2006
CN       101166091 A     4/2008
(Continued)

OTHER PUBLICATIONS

BPI—Forgot your User ID or Password? Don't worry!—accessed May 5, 2015—published on or before Apr. 7, 2003 https://web.archive.org/web/20030407043849/http://www.bpiexpressonline.com/passwordreset.htm—all pages pertinent.*
(Continued)

*Primary Examiner* — Andrew Bee
(74) *Attorney, Agent, or Firm* — Paradice and Li LLP

(57) ABSTRACT

According to one embodiment, a first unlock code is received 420 at a user device 210 from a computer based unlock code generator. The first unlock code is received at a part of receiving a lock command for locking the user device 210. The unlock code generator is not under the control of the user. The first unlock code 212 is stored 430 at the user device 210. A second unlock code, which is provided by the user via a computer based device, is received 440 at the user device 210. The first unlock code 212 and the second unlock code are compared 450 at the user device. The user device is unlocked 460 if the first unlock code 212 is the same as the second unlock code.

15 Claims, 4 Drawing Sheets

(51) Int. Cl.
*H04M 1/673* (2006.01)
*H04M 1/66* (2006.01)
*H04M 1/67* (2006.01)

(58) Field of Classification Search
CPC ....... G06F 17/30362; G06F 2221/2117; G06F 2221/2137; G06F 2221/2143; G06F 12/1466; G06F 21/604; G06F 2221/2147; G06F 2221/2149; G06F 21/305; G06F 2221/2131; G06F 21/121; G07C 2209/08; H04L 63/083; H04L 9/0863; H04L 63/0846; H04L 9/3228; H04M 1/66; H04M 1/673; H04W 12/06
USPC ............. 455/411; 340/5.28, 5.31, 5.51, 5.54, 340/5.85; 70/272, 273, 274; 715/867
See application file for complete search history.

(56) References Cited

U.S. PATENT DOCUMENTS

| | | | |
|---|---|---|---|
| 6,286,104 | B1 | 9/2001 | Buhle et al. |
| 6,662,023 | B1* | 12/2003 | Helle ............................ 455/558 |
| 6,941,468 | B2* | 9/2005 | Johnson .......................... 726/22 |
| 6,950,202 | B1* | 9/2005 | Kikugawa .................... 358/1.15 |
| 7,881,745 | B1* | 2/2011 | Rao et al. ...................... 455/551 |
| 8,490,169 | B2* | 7/2013 | Hird ................................. 726/9 |
| 2001/0004591 | A1* | 6/2001 | Jeong ...................... H04M 3/38 455/419 |
| 2002/0180582 | A1* | 12/2002 | Nielsen .......................... 340/5.6 |
| 2003/0088633 | A1* | 5/2003 | Chiu ....................... H04L 29/06 709/206 |
| 2003/0208683 | A1* | 11/2003 | Johnson .................. G06F 21/31 713/183 |
| 2004/0143746 | A1* | 7/2004 | Ligeti et al. ................... 713/185 |
| 2005/0044404 | A1* | 2/2005 | Bhansali ............... G06F 21/572 726/26 |
| 2005/0044906 | A1* | 3/2005 | Spielman .......................... 70/63 |
| 2005/0197099 | A1* | 9/2005 | Nehushtan .................... 455/410 |
| 2005/0221800 | A1* | 10/2005 | Jackson ............ H04M 1/72552 455/411 |
| 2006/0079204 | A1 | 4/2006 | Pon et al. |
| 2006/0165060 | A1* | 7/2006 | Dua .............................. 370/352 |
| 2006/0236325 | A1* | 10/2006 | Rao et al. ...................... 719/315 |
| 2006/0276172 | A1* | 12/2006 | Rydgren et al. .............. 455/410 |
| 2007/0082705 | A1* | 4/2007 | Jain et al. ...................... 455/558 |
| 2007/0130255 | A1* | 6/2007 | Wolovitz et al. ............. 709/204 |
| 2007/0156804 | A1* | 7/2007 | Mo ................................ 709/200 |
| 2007/0259633 | A1* | 11/2007 | Rao .............................. 455/130 |
| 2008/0040786 | A1* | 2/2008 | Chang .................. G06F 1/3287 726/10 |
| 2008/0083016 | A1* | 4/2008 | Itoh ................................ 726/2 |
| 2008/0150677 | A1* | 6/2008 | Arakawa ........................ 340/5.2 |
| 2008/0220744 | A1* | 9/2008 | Rydgren et al. .............. 455/411 |
| 2009/0149192 | A1* | 6/2009 | Vargas .................. H04W 64/00 455/456.1 |

FOREIGN PATENT DOCUMENTS

| | | |
|---|---|---|
| JP | 20050328435 | 11/2005 |
| KR | 1020060002603 | 1/2006 |
| KR | 1020070056496 | 6/2007 |
| WO | WO-2007027065 | 3/2007 |

OTHER PUBLICATIONS

International Search Report and Written Opinion—PCT/US2008/071762—ISA/EPO—Dec. 30, 2008, 6 pages.

* cited by examiner

UNLOCKING A LOCKED USER DEVICE USING A COMPUTER GENERATED UNLOCK CODE PROVIDED BY A USER

TECHNICAL FIELD

Embodiments of the present invention relate to managing user devices. More specifically, embodiments of the present invention are related to unlocking a locked user device using a computer generated unlock code provided by a user.

BACKGROUND ART

In today's world, electronic user devices are very common. For example, many people have cell phones and personal assistant devices (PDAs) that they carry around with them. As a result of the ubiquitous use of electronic user devices, it is becoming increasingly more common for users to loss their devices or to be the victim of the devices being stolen. The person who obtains the device may access the device owner's personal information or use expensive services provided by the device that the owner is obligated to pay for. Thus, there is a need for a way to prevent lost or stolen devices from being accessed or used. Further, there is a need for an efficient way to prevent lost or stolen devices from being accessed or used.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
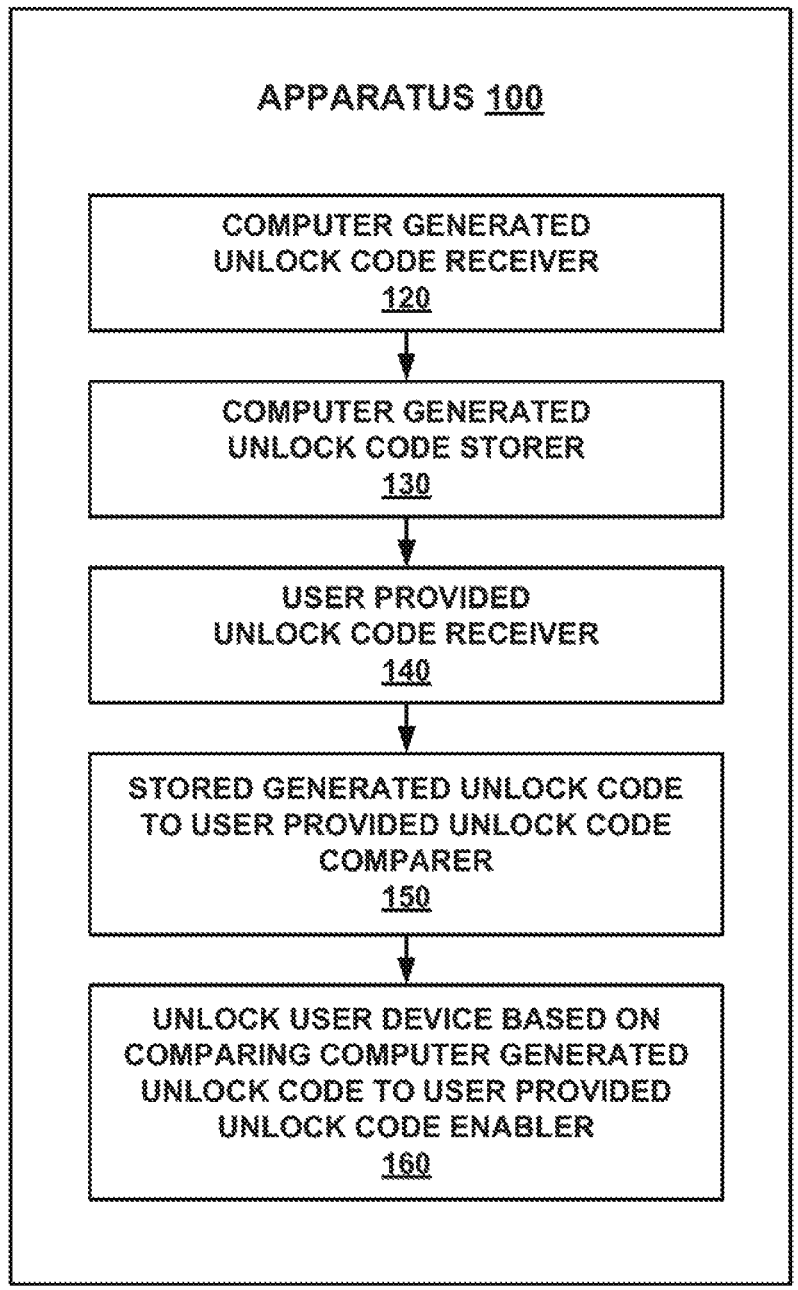
FIG. 1 depicts a block diagram of an apparatus 100 for unlocking a user device, according to one embodiment.

The drawings referred to in this description should not be understood as being drawn to scale except if specifically noted.

BEST MODE FOR CARRYING OUT EMBODIMENTS OF THE PRESENT INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of various embodiments of the present invention, numerous specific details are set forth in order to provide a thorough understanding of the present invention. In other instances, well-known methods, procedures, components, and circuits have not been described in detail so as not to unnecessarily obscure aspects of the present invention.

Overview

In the event that a user losses their cell phone or PDA, the user can call customer care or interact with a web based service to have their device locked up. The user may provide information to verify that they are the owner of the user device. According to one embodiment, an unlock code is provided to the user as a part of locking the user device. The unlock code can be provided to the user by transmitting the unlock code to the user's email address, by displaying the unlock code on a web page, or can be provided to the user verbally, for example, over the phone.

If the user finds their device at a later point in time, the user can use the unlock code to unlock their user device without having to call customer care. For example, the user can enter the unlock code directly into their user device. Thus, various embodiments provide an efficient way to prevent lost or stolen devices from being accessed or used.

Entities that Users Interact with to Lock their Devices

In the event that a user losses a device, they can have their device locked by interacting with a web based service or calling customer care on the phone. The web based service may be a customer care portal or may be a self care portal provided, for example, by the device's service provider to enable users to act on their own behalf.

According to one embodiment, an unlock code is provided to the user as a part of locking the user device. The unlock code can be used to unlock the device in the event that at a later time the user locates their user device.

Authentication

According to one embodiment, the user provides information to customer care or a web based service to prove that they are the owner of the device before the device is locked and they are provided with an unlock code. For example, the user may provide, among other things, a certificate, a password, an account number, a phone number, an answer to a question that only the user may know, some personal information, or a combination thereof.

More specifically, the user may log into a self care portal or a customer care portal with a password. In another example, the user may call customer care. In a small company the customer care operators may know the person. If not, the user may provide information such as an employee identification number to the customer care operators.

Locking a User Device

There are several ways that a user device can be locked. The keyboard of the user device may be disabled so that a person cannot interact with the user device. In another example, various major functions of the user device may be disabled. According to one embodiment, the user device is put in a mode so that it will only accept an unlock code. More specifically, the user device may display a user interface where only the unlock code can be entered and all other functions are disabled.

Unlock Codes

According to one embodiment, the unlock code that is provided to the user as a part of locking the user device is generated by a computer. The computer generated unlock code is sufficiently complex that a person can not determine what the computer generated unlock is, for example, by trial and error or by guessing. For example, the computer generated unlock code may be a half dozen alphanumeric characters that are randomly generated by a computer.

According to one embodiment, an unlock code is generated by an unlock code generator that executes on a computer. The unlock code generator may reside on a management server, as will become more evident, or may reside with the entity that the user interacted with to lock their user device. For example, the unlock code generator may reside at a web based service the user interacted with to lock their device, such as a self care portal or a customer care portal.

The computer generated unlock code can be provided to the user verbally over the phone, for example, by customer care personal. The computer generated unlock code can be provided to the user by transmitting the unlock code to the user's email address. The user may have provided their email address as a part of registering their phone.

The user can make a record of the computer generated unlock code and in the event that the user finds their device, the user can use it to unlock their device. The unlock code that is provided by the user is referred to herein as a "user provided unlock code."

According to one embodiment, an unlock code expires after a period of time. For example, an unlock code may be used to unlock a user device for a period of 3 days. After the expiration period has elapsed, the unlock code cannot be used to unlock the user device. Continuing the example, the unlock code will expire after the 3 day period has elapsed. If the user finds their device after 3 days have elapsed, the user can still get their device unlocked, for example, by interacting with customer care or a self care portal.

Although the above example referred to an expiration period of 3 days, the expiration period can be specified with any measure of time, such as hours, days, months or a combination thereof.

Apparatus for Unlocking a User Device

FIG. 1 depicts a block diagram of an apparatus 100 for unlocking a user device, according to one embodiment. The blocks that represent features in FIG. 1 can be arranged differently than as illustrated, and can implement additional or fewer features than what are described herein. Further, the features represented by the blocks in FIG. 1 can be combined in various ways. The system 100 can be implemented using software, hardware, firmware, or a combination thereof.

The apparatus 100, according to one embodiment, includes a computer-generated-unlock-code-receiver 120 (referred to herein as a "CGUC receiver"), a computer-generated-unlock-code-storer 130 (referred to herein as a "storer"), a user-provided-unlock-code-receiver 140 (referred to herein as a "UPUC receiver"), a stored-generated-unlock-code-to-user-provided-unlock-code-comparer 150 (referred to herein as a "comparer"), and an unlock-user-device-based-on-comparing-computer-generated-unlock-code-to-user-provided-unlock-code-enabler 160 (referred to herein as "unlock enabler").

The CGUC receiver 120 is configured for receiving from an unlock code generator a computer generated first unlock code for unlocking a user device. The unlock code generator is not under the control of the user, according to one embodiment. The first unlock code is also referred to as a "computer generated unlock code." The storer 130 is configured for storing the first unlock code at a device that the apparatus 100 resides on. According to one embodiment, the apparatus 100 resides on the user device. According to another embodiment, the apparatus 100 resides on a device that a management server also resides on. The UPUC receiver 140 is configured for receiving a second unlock code. The second unlock code, according to one embodiment, is provided by the user. The second unlock code is entered into a computer based device by the user. The second unlock code is also referred to herein as a "user provided unlock code." The comparer 150 is configured for comparing the first unlock code to the second unlock code. The unlock enabler 160 is configured for causing the user device to be unlocked if the first unlock code is the same as the second unlock code.

As will become more evident, the apparatus 100 depicted in FIG. 1 can reside on the user device or on the same device that a management server resides on, among other things.

System for Unlocking a User Device

Figure 2:
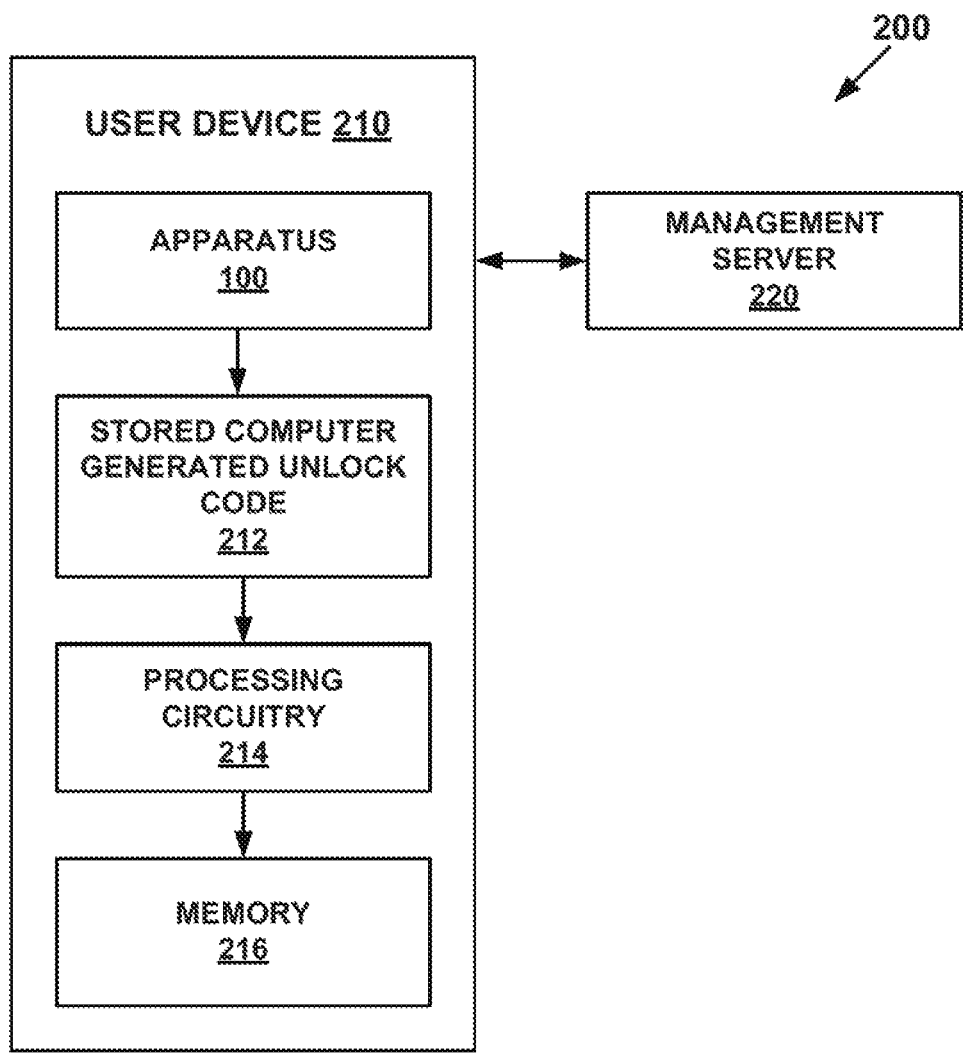
FIG. 2 depicts a block diagram of a system for unlocking a user device where the apparatus depicted in FIG. 1 resides on the user device, according to one embodiment.
Figure 3:
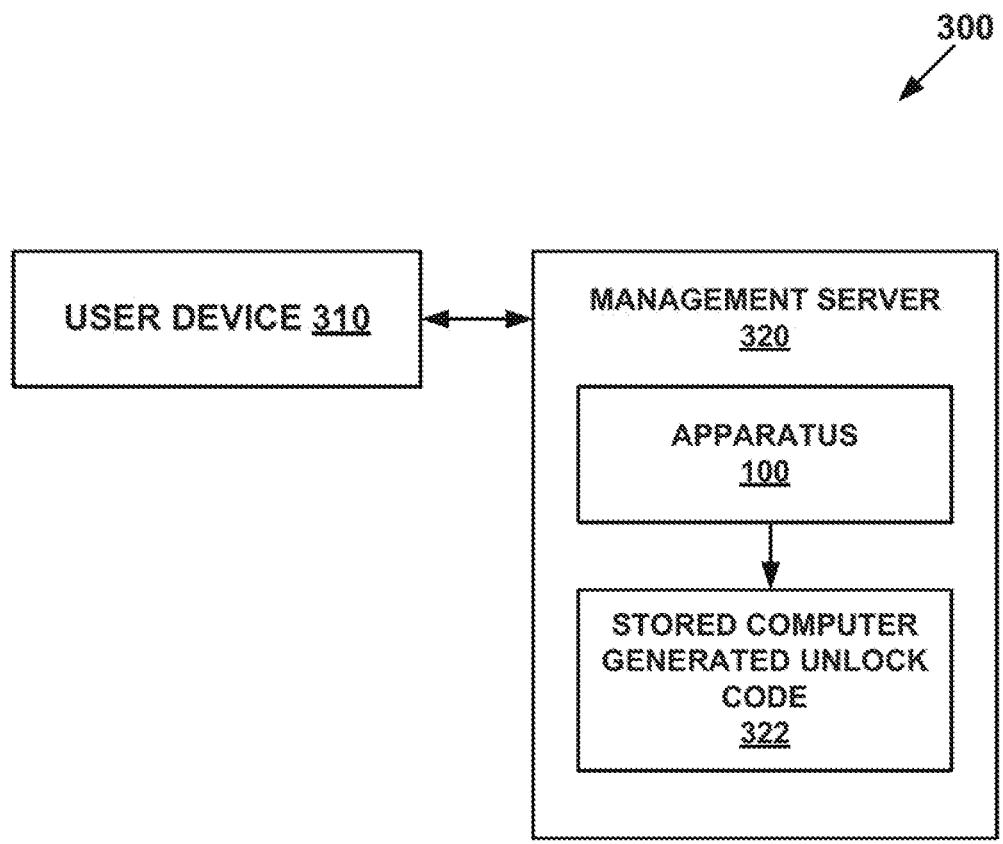
FIG. 3 depicts a block diagram of a system for unlocking a user device where the apparatus depicted in FIG. 1 and a management server reside on the same device, according to one embodiment.

FIG. 2 depicts a block diagram of a system 200 for unlocking a user device 210 where the apparatus 100 depicted in FIG. 1 resides on the user device 210, according to one embodiment. FIG. 3 depicts a block diagram of a system 300 for unlocking a user device 310 where the apparatus 100 depicted in FIG. 1 and a management server 320 reside on the same device, according to one embodiment.

The blocks that represent features in FIGS. 2 and 3 can be arranged differently than as illustrated, and can implement additional or fewer features than what are described herein. Further, the features represented by the blocks in FIGS. 2 and 3 can be combined in various ways. The systems 200 and 300 can be implemented using software, hardware, firmware, or a combination thereof.

The user device 210, 310 can be any type of electronic device that can be lost or stolen. For example, the user device 210, 310 may be a cell phone or a personal digital assistant (PDA), among other things. A client, such as Open Mobile Alliance Device Management (OMA DM) Client™ may be associated with the user device 210, 310.

The management server 220, 320 may be any type of hardware, software, or firmware that can be used for managing the locking or unlocking of a user device. The management server 220, 320, according to one embodiment, is an Open Mobile Alliance Device Management (OMA DM) Server™ version 1.2.

According to one embodiment, the stored computer generated unlock code is co-located with the apparatus 100. For example, if the apparatus 100 resides on the user device 210, the computer generated unlock code 212 is stored on the user device 210 as depicted in FIG. 2. If the apparatus 100 resides on the same device that the management server 320 resides on, then the computer generated unlock code 322 is stored on the management server 320's device as depicted in FIG. 3. According to another embodiment, the stored computer generated unlock code is not co-located with the apparatus 100.

User device 210 may also include processing circuitry 214, such as a CPU and registers, among other things, and memory 216. The stored computer generated unlock code 212 may be stored in the memory 216.

According to one embodiment, at least a part of the apparatus 100 is implemented as an object that is transmitted to a user device 210. For example, the apparatus 100 may be a part of a lock management object that is transmitted from a management server to the user device. The lock management object may include the computer generated lock code and a method for accessing the computer generated lock code. Various features associated with the apparatus 100, such as the storer 130, the UPUC receiver 140, the comparer 150, and the unlock enabler 160 can be implemented as methods associated with the lock management object. The CGUC receiver 120 can be implemented as a variable, for example, on the user device 210 that is defined as type lock management object. The variable can be initialized with a lock management object that the user device 210 receives, as will become more evident.

In another embodiment, at least a part of the apparatus 100 is implemented as an object that is co-located with the management server 320, as will be described in the context of flowchart 400 and FIG. 3.

According to another embodiment, the apparatus 100 is not implemented as an object. For example, the apparatus 100 (FIG. 1) may be implemented with software instructions that were installed on the user device 210 or the device where the management server 320 resides.

Method for Unlocking a User Device

Figure 4:
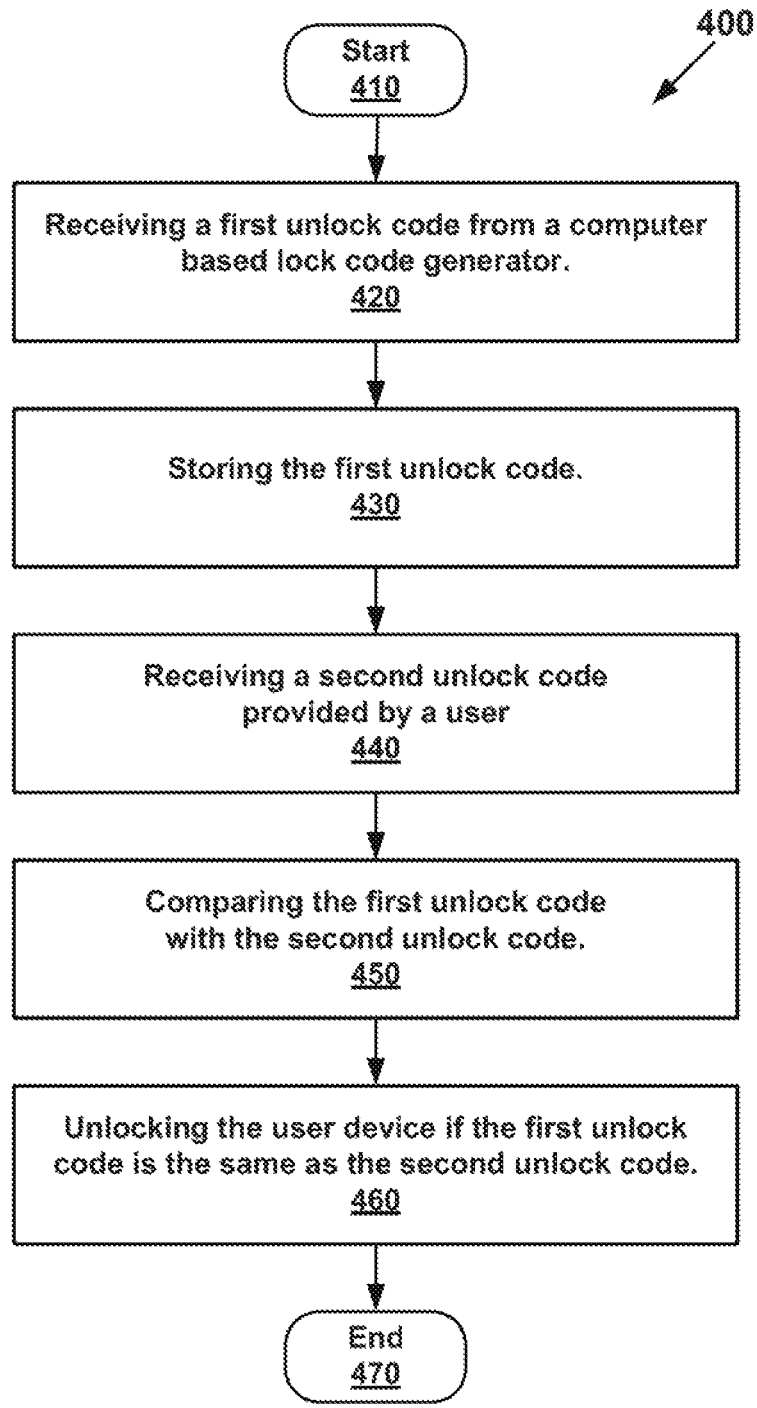
FIG. 4 depicts a flowchart for a method of unlocking a user device, according to one embodiment.

FIG. 4 depicts a flowchart 400 for a method of unlocking a user device, according to one embodiment. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed.

All of, or a portion of, the embodiments described by flowchart 400 can be implemented using computer-readable and computer-executable instructions which reside, for example, in computer-usable media of a computer system or like device. The computer-usable media can be any kind of memory that instructions can be stored on. Examples of the computer-usable media include but are not limited to a disk, a compact disk (CD), a digital video device (DVD), read only memory (ROM), flash, and so on. As described above, certain processes and steps of the present invention are realized, in one embodiment, as a series of instructions (e.g., software program) that reside within computer readable memory of a computer system and are executed by the processor of the computer system. When executed, the instructions cause the computer system to implement the functionality of the present invention as described below.

The flowchart 400 will be used to describe two embodiments. The first embodiment pertains to the apparatus 100 (FIG. 1) residing on a user device 210 as depicted in FIG. 2. The second embodiment pertains to the apparatus 100 (FIG. 1) being co-located with a management server 320 as depicted in FIG. 3.

In the present embodiment, certain operations are taken to prepare for the description of flowchart 400. Assume, for the embodiments depicted in FIGS. 2 and 3 that the user has either interacted with a web service, such as a customer care portal or a self care portal, or called customer care in response to loosing their user device. The management server is used to authenticate the user. For example, the user may provide a certificate, provide a password, provide an answer to a question that only the user knows the answer to, or provide personal information. The management server can transmit a lock command to the user device causing the user device to be locked. For example, in one embodiment, the management server may transmit a lock management object to the user device.

As will become more evident in the descriptions of flowcharts 400, the lock management object can be used to lock the user device, to unlock the user device, or a combination thereof. An unlock code generator, that is associated for example with the management server 220, 320, can generate an unlock code that is provided to the user. The lock management object may also include the computer generated unlock code and an unlock method. The management server 220, 320 could open a session with a client on the user device 210, 310 using the lock management object and use a handle associated with the lock management object to cause a lock command to be executed.

The following describes the flowchart 400 in the context of the embodiment depicted in FIG. 2 where the apparatus 100 resides on the user device 210.

The method begins at step 410

At 420, the first unlock code is received from a computer based unlock code generator. For example, the unlock code generator may be co-located with the management server 220. The unlock code, that was generated by the unlock code generator (also referred to herein as the "computer generated unlock code"), can be transmitted from the management server 220 to the user device 210. The CGUC receiver 120 can receive the computer generated unlock code that is transmitted to the user device 210. The computer generated unlock code may be received at the user device 210 as a part of a lock management object that is transmitted to the user device 210 from the management server 220.

The computer generated unlock code may be displayed to the user on a web based service that the user interacted with to lock their device 210, provided verbally by customer care over the phone when the user called customer care to have their device 210 locked, or emailed to the user as a result of using a web based service or calling customer care, for example. The user can make a record of the computer generated unlock code.

According to one embodiment, the storer 130, the UPUC receiver 140, the comparer 150, and the unlock enabler 160 associated with the apparatus 100 (FIG. 1) are implemented as methods associated with the lock management object. The CGUC receiver 120 can be implemented in the user device 210 as a variable that is defined as type lock management object. The user device 210 receives the lock management object from the management server 220. The variable associated with the user device 210 is initialized with the received lock management object, as will become more evident. The user device 210 can use the methods associated with the received lock management object to store the computer generated unlock code, to receive the user provided unlock code, to compare the computer generated unlock code with user provided unlock code and to cause an unlock to be performed, as will become more evident.

According to another embodiment, the apparatus 100 is not implemented as an object. For example, the apparatus 100 (FIG. 1) may be implemented with software instructions that were installed on the user device 210.

At 430, the first unlock code is stored. For example, the storer 130 located at the user device 210 can store the computer generated unlock code at the location 212 associated with the user device 210 as depicted in FIG. 2.

The computer generated unlock code may be stored as a part of initializing a variable of type lock management object with the received lock management object.

At 440, a second unlock code, which is provided by a user, is received. The user can provide the unlock code that they made a record of as described under 420. The user provided unlock code is entered into a computer based device by the user. For example, the user device 210 may be in a mode that only allows an unlock code to be entered. The user could, for example, provide the unlock code by entering the unlock code into the user device 210. In another example, the user may enter the unlock code into a web based service, such as a self care portal executes on. The user device 210 and the device that executes the self care portal are examples of computer based devices that the user can enter the user provided unlock code into. Thus, the user can avoid the time consuming process of calling customer care to have their user device unlocked. The UPUC receiver 140 can receive the user provided unlock code.

At 450, the first unlock code is compared with the second unlock code. For example, the comparer 150 can compare the computer generated unlock code 212 with the user provided unlock code.

At 460, the user device is unlocked if the first unlock code is the same as the second unlock code. For example, the unlock enabler 160 can cause the user device 210 to be unlocked if the comparer 150 indicates that the computer generated unlock code is the same as the user provided unlock code.

The user device 210 may be unlocked, for example, by executing an unlock method, such as the unlock enabler 160, associated with the lock management object.

The user device 210, according to one embodiment, opens a session with the management server 220 and notifies the management server 220 that the user device 210 has been unlocked.

At 470, the method ends.

The following describes the flowchart 400 in the context of the embodiment depicted in FIG. 3 where the apparatus 100 is co-located with the management server 320.

The method begins at step 410

At 420, the first unlock code is received from a computer based unlock code generator. For example, the unlock code generator may be co-located with the management server 320. The unlock code, that is generated by the unlock code generator (also referred to herein as the "computer generated unlock code"), can be received by the GCUC receiver 120, which is co-located with the management server 320.

The computer generated unlock code may be displayed to the user on a web based service that the user interacted with to lock their device, provided verbally by customer care over the phone when the user called customer care to have their device locked, or emailed to the user as a result of using a web based service or calling customer care, for example. The user can make a record of the computer generated unlock code.

The apparatus 100 may be implemented as an object that is co-located with the management server 320. For example, the GCUC receiver 120, the starer 130, the UPUC receiver 140, the comparer 150, and the unlock enabler 160 associated with the apparatus 100 (FIG. 1) can be implemented as methods associated with an object located on the management server 320. The management server 320 can use the methods associated with the object to store the computer generated unlock code, to receive the user provided unlock code, to compare the computer generated unlock code with user provided unlock code and to cause the user device to be unlocked, as will become more evident.

According to another embodiment, the apparatus 100 is not implemented as an object. For example, the apparatus 100 (FIG. 1) may be implemented with software instructions that were installed on the device where the management server 320 resides.

At 430, the first unlock code is stored. For example, the storer 130 located at the management server 320 can store the computer generated unlock code at the location 322 associated with the management server 320 as depicted in FIG. 3.

At 440, a second unlock code, which is provided by a user, is received. For example, assume that the user finds their user device 310. The user can provide the unlock code that they made a record of as described under 420. The user provided unlock code is entered into a computer based device by the user. For example, the user device 310 may be in a mode that only allows an unlock code to be entered. The user could, for example, provide the unlock code by entering the unlock code into the user device 310. In another example, the user may enter the unlock code into a web based service, such a self care portal. The user device 310 and the device that executes the self care portal are examples of computer based devices that the user can enter the user provided unlock code into. Thus, the user can avoid the time consuming process of calling customer care to have their user device unlocked. The UPUC receiver 140 can receive the user provided unlock code.

At 450, the first unlock code is compared with the second unlock code. For example, the comparer 150 can compare the computer generated unlock code 322 with the user provided unlock code.

At 460, the user device is unlocked if the first unlock code is the same as the second unlock code. For example, if the comparer 150 indicates that the computer generated unlock code 322 is the same as the user provided unlock code, the management server 320 can establish a session with a client associated with the user device 310 and cause the unlock enabler 160 to command the user device 310 to be unlocked. For example, the management server 320 could open a session with a client on the user device 210 using the lock management object that was transmitted to the user device 320 by using the handle associated with the lock management object to cause a lock command to be executed.

The management server 320 may authenticate the user device 310 as a part of unlocking the user device 310.

At 470, the method ends.

CONCLUSION

Various embodiments provide an efficient way of locking a lost or stolen user device, for example, by allowing a user to enter a computer generated unlock code (the "user provided unlock code") into a computer based device, instead of requiring the user to spend a significant amount of time calling customer care over the phone. Examples of a computer based device that the user can enter the computer generated unlock code into are the user device or a device that executes a web based service, such as a self care portal.

Further, various embodiments provide a high level of security by using a computer generated unlock code that is sufficiently complex to prevent someone from determining the unlock code by trail and error or by guessing. For example, many electronic devices or web based services allow users to log in using passwords that were determined by the user. Frequently, these passwords are not very complex. For example, the passwords may only include 4 numbers which can be determined fairly quickly by trial and error. Or the passwords may be personal information such as birth dates or names of children which can easily be determined. In contrast, a computer generated unlock code would not include personal information that can be obtained or guessed. Further, a computer generated unlock code would be sufficiently complex to prevent someone from determining the unlock code by trail and error. Thus, a computer generated unlock code could not be guessed or determined by trial and error.

Various embodiments have been described in various combinations. However, any two or more embodiments may be combined. Further, any embodiment may be used separately from any other embodiment.

Embodiments of the present invention are thus described. While the present invention has been described in particular embodiments, it should be appreciated that the present invention should not be construed as limited by such embodiments, but rather construed according to the following claims.

What is claimed is:

1. A method for restricting access to a mobile device including at least a processor and a memory, the method performed by the mobile device and comprising:
   receiving a lock command from a web based service;
   storing a first unlock code in the memory;
   locking the mobile device, in response to the received lock command, by placing the mobile device in a mode during which (1) the mobile device is configured to accept an unlock code and (2) other functions of the mobile device are disabled;
   receiving a second unlock code from the web based service;
   comparing the first unlock code and the second unlock code; and
   unlocking the mobile device and enabling other previously disabled functions of the mobile device in response to a match between the comparison of the first unlock code and the second unlock code,
   wherein the lock command and the first unlock code are received from the web based service in response to a user authentication through an online self-care portal of the web based service.

2. The method of claim 1, wherein the lock command is received from the web based service in response to an indication that the mobile device is lost or stolen.

3. The method of claim 1, wherein the second unlock code is received from a computer associated with the web based service.

4. The method of claim 1, wherein the first unlock code and the lock command are received at the same time.

5. The method of claim 1, wherein the second unlock code is provided to the user via an email.

6. A non-transitory computer readable medium storing instructions that, when executed by one or more processors of a mobile device, cause the mobile device to:
   receive a lock command from a web based service;
   store a first unlock code in a memory of the mobile device;
   lock the mobile device, in response to the received lock command, by placing the mobile device in a mode during which (1) the mobile device is configured to accept an unlock code and (2) other functions of the mobile device are disabled;
   receive a second unlock code from the web based service;
   compare the first unlock code and the second unlock code; and
   unlock the mobile device and enabling other previously disabled functions of the mobile device in response to a match between the comparison of the first unlock code and the second unlock code,
   wherein the lock command and the first unlock code are received from the web based service in response to a user authentication through an online self-care portal of the web based service.

7. The non-transitory computer readable medium of claim 6, wherein the lock command is received from the web based service in response to an indication that the mobile device is lost or stolen.

8. The non-transitory computer readable medium of claim 6, wherein the second unlock code is received from a computer associated with the web based service.

9. The non-transitory computer readable medium of claim 6, wherein the first unlock code and the lock command are received at the same time.

10. The non-transitory computer readable medium of claim 6, wherein the second unlock code is provided to the user via an email.

11. A mobile device, comprising:
    one or more processors; and
    a memory configured to store instructions that, when executed by the one or more processors, cause the mobile device to perform operations comprising:
      receiving a lock command from a web based service;
      storing a first unlock code in the memory;
      locking the mobile device, in response to the received lock command, by placing the mobile device in a mode during which (1) the mobile device is configured to accept an unlock code and (2) other functions of the mobile device are disabled;
      receiving a second unlock code from the web based service;
      comparing the first unlock code and the second unlock code; and
      unlocking the mobile device and enabling other previously disabled functions of the mobile device in response to a match between the comparison of the first unlock code and the second unlock code,
      wherein the lock command and the first unlock code are received from the web based service in response to a user authentication through an online self-care portal of the web based service.

12. The mobile device of claim 11, wherein the lock command is received from the web based service in response to an indication that the mobile device is lost or stolen.

13. The mobile device of claim 11, wherein the second unlock code is received from a computer associated with the web based service.

14. The mobile device of claim 11, wherein the first unlock code and the lock command are received at the same time.

15. The mobile device of claim 11, wherein the second unlock code is provided to the user via an email.

* * * * *